US011396401B2

(12) United States Patent
Johnson et al.

(10) Patent No.: US 11,396,401 B2
(45) Date of Patent: Jul. 26, 2022

(54) CONTAINER WITH FILL GAUGE

(71) Applicant: Express Scripts Strategic Development, Inc., St. Louis, MO (US)

(72) Inventors: Stanley Joe Johnson, Tarrytown, NY (US); Christopher M. Myers, Dublin, OH (US)

(73) Assignee: Express Scripts Strategic Development, Inc., St. Louis, MO (US)

(*) Notice: Subject to any disclaimer, the term of this patent is extended or adjusted under 35 U.S.C. 154(b) by 37 days.

(21) Appl. No.: 17/167,422

(22) Filed: Feb. 4, 2021

(65) Prior Publication Data
US 2021/0155378 A1 May 27, 2021

Related U.S. Application Data

(63) Continuation of application No. 16/391,561, filed on Apr. 23, 2019, now Pat. No. 10,947,012.

(51) Int. Cl.
| | | |
|---|---|---|
| *G01F 19/00* | (2006.01) | |
| *B65D 25/56* | (2006.01) | |
| *A61J 1/03* | (2006.01) | |
| *B65B 1/30* | (2006.01) | |
| *G01F 23/02* | (2006.01) | |

(52) U.S. Cl.
CPC ............... *B65D 25/56* (2013.01); *A61J 1/03* (2013.01); *B65B 1/30* (2013.01); *G01F 19/00* (2013.01); *G01F 23/02* (2013.01); *B65D 2203/04* (2013.01)

(58) Field of Classification Search
CPC ............ G01F 19/00; G01F 23/02; B65B 1/30
See application file for complete search history.

(56) References Cited

U.S. PATENT DOCUMENTS

| | | | |
|---|---|---|---|
| 2,218,246 A | 10/1940 | McGrady | |
| 2,294,574 A | 9/1942 | Ravenscroft | |
| 2,703,127 A | 3/1955 | Webb | |
| 2,961,108 A | 11/1960 | Johnson | |
| 3,383,013 A | 5/1968 | Szekely | |
| 4,227,615 A | 10/1980 | Flick | |
| 4,587,846 A | 5/1986 | Coma Julia | |
| 5,784,178 A | 7/1998 | Tsai | |
| 8,756,998 B1 | 6/2014 | Joplin | |
| 9,403,624 B2* | 8/2016 | Traboulsi | .............. A61J 1/2093 |

(Continued)

FOREIGN PATENT DOCUMENTS

| | | | |
|---|---|---|---|
| FR | 22988401 A | 8/1976 | |
| WO | 2018017530 A1 | 1/2018 | |
| WO | WO-2018017530 A1 * | 1/2018 | ................ A61J 1/03 |

*Primary Examiner* — Jamel E Williams

(57) ABSTRACT

A container to hold contents therein is described with a gauge to indicate the level of contents in the container. The container can be a prescription container to store capsules, tablets, pills and the like. A label is affixed outside the container and is substantially opaque such that the interior is not visible through the label. The label including a vertical, transparent viewing window to see past the label, through the container wall to view the contents therein. The label includes indicia and indicators adjacent the window to indicate a time remaining for the supply of contents in the container or other characteristics of the contents. The time remaining can be calculated by the container volume and characteristics of the contents.

23 Claims, 12 Drawing Sheets

(56) References Cited

U.S. PATENT DOCUMENTS

| | | |
|---|---|---|
| 10,947,012 B1* | 3/2021 | Johnson ................. B65D 25/56 |
| 2007/0141520 A1 | 6/2007 | Raeder |
| 2009/0289072 A1 | 11/2009 | Jo |
| 2010/0133139 A1* | 6/2010 | Lowe ..................... B65D 25/54 |
| | | 206/534 |
| 2012/0024742 A1 | 2/2012 | Berger |
| 2013/0021878 A1* | 1/2013 | Harris .................... G04F 1/005 |
| | | 368/10 |
| 2013/0062239 A1 | 3/2013 | Key |
| 2013/0248557 A1 | 9/2013 | Egger |
| 2014/0065076 A1 | 3/2014 | Hollander |
| 2014/0120214 A1 | 5/2014 | Egger |
| 2016/0031604 A1 | 2/2016 | Kessler |
| 2019/0128722 A1* | 5/2019 | Caldwell ............... G01F 19/002 |
| 2019/0282444 A1* | 9/2019 | Terhune ................... A61J 1/03 |
| 2022/0113176 A1* | 4/2022 | Six .......................... A01K 5/00 |

\* cited by examiner

CONTAINER WITH FILL GAUGE

CROSS-REFERENCE TO RELATED APPLICATIONS

This application is a continuation of U.S. application Ser. No. 16/391,561, which was filed Apr. 23, 2019. The entire disclosure of said application is incorporated herein by reference.

FIELD

The present disclosure relates to generally to containers to store contents therein with a fill gauge to indicate the contents, and more specifically, to prescription containers with a fill gauge to show cumulative drug units in the prescription container.

BACKGROUND

U.S. Pat. No. 4,227,615 describes a medicine container of opaque or translucent material provided with an aperture to allow one to clearly view the contents of the container. In one embodiment of U.S. Pat. No. 4,227,615, the container is characterized by a transparent window in the cylindrical side wall thereof, while two other embodiments provide for a transparent bottom to the container.

U.S. Patent Application Publication No. 2010/0133139 describes a prescription medication bottle that has a viewing window. This "viewer window' will display one or more pills, thereby enabling the pills to be visible within the bottle to the patient and pharmacy staff. The bottle comprises an internal shelf structure which creates a viewing chamber. One or more pills will become "caught" by the shelf structure and be displayed in the viewing chamber when the pharmacist places all the pills into the vial. The viewing chamber is visible through the viewing window. The viewing window may have the capability to magnify the area in which the pill rests and thereby provide a magnified view of the pill.

WO 2018/017530 describes a medicament packaging system that includes a container that provides a window to facilitate visualization, monitoring, identification, inspection and/or confirmation of quantity, amount, volume, shape, color, size, type and/or tampering of medication within the container.

U.S. Patent Application Publication No. 2012/0024742 describes a container for housing a composition comprising at least one active pharmaceutical agent. The container includes an interior for housing the composition and a viewing window allowing the user to view the interior region from the outside of the container.

SUMMARY

This section provides a general summary of the present disclosure and is not a comprehensive disclosure of its full scope or all of its features, aspects and objectives.

In accordance with one aspect of the disclosure, a prescription container comprises a bottom, a wall extending upwardly from the bottom, the wall being substantially transparent and forming an open top, the wall and the bottom forming an open interior configured to receive a supply of dry contents, the open top being configured to receive a closure thereon. The prescription container includes a label affixed to the wall and being substantially opaque such that the interior is not visible through the label, the label including a vertical, transparent viewing window. Indicia are positioned on the label adjacent the viewing window to indicate a time remaining for the supply of contents.

In accordance with an aspect of the disclosure, the indicia are calculated based on a volume of the interior and day supply characteristics of the contents.

In accordance with an aspect of the disclosure, the characteristics of the contents includes volume of each content unit.

In accordance with an aspect of the disclosure, the characteristics of the pills includes a statistical computation of how the supply of contents lie in the interior.

In accordance with an aspect of the disclosure, the indicia are adjusted vertically along the viewing window to indicate time remaining of the supply of pills.

In accordance with an aspect of the disclosure, the indicia show a maximum supply (e.g., a 90-day supply), a second most supply (e.g., a 60-day supply), and a least supply (e.g., a 30-day supply) of the supply of pills in the interior vertically downwardly along the viewing window. The indicia may Operate to indicate a content supply level in the container based on time or based on quantity.

In accordance with an aspect of the disclosure, the characteristics of the contents includes a range of a volume of the supply of the contents. The range of the content volume can include the actual volume of the quantity of contents plus a range of voids that are statistically created in the container for a specific quantity of contents, e.g., pills or other dry constructions that do not flow.

In accordance with an aspect of the disclosure, the characteristics of the contents includes a sum of volumes of all the content units in a prescription order to be placed in the interior.

In accordance with an aspect of the disclosure, the viewing window extend from a bottom of the label to a top of the label.

In accordance with an aspect of the disclosure, the label includes vertically narrow webs extending essentially horizontally connecting a first edge of the label to a second edge of the label at a top and a bottom of the viewing window.

In accordance with an aspect of the disclosure, the indicia include a supply indicia adjacent the window showing a remaining supply of the contents.

In accordance with an aspect of the disclosure, the container further comprising an indicator adjacent the window showing a level of a remaining supply of the contents.

In accordance with an aspect of the disclosure, a method of creating a fill gauge on a container is described. The method includes receiving a content type for loading into a container, receiving a content quantity for loading into the container, receiving a container type, receiving a label type to be applied to the container, and generating a fill gauge to be applied to the label to indicate levels of contents in the container using the content type, the content quantity, and the container type.

In accordance with an aspect of the disclosure, generating the fill gauge includes printing an indicator and an indicia on the label.

In accordance with an aspect of the disclosure, generating the fill gauge includes forming a window in the label.

In accordance with an aspect of the disclosure, printing an indicator and an indicia on the label includes printing the indicator adjacent the window and the indicia adjacent the indicator.

In accordance with an aspect of the disclosure, forming a window in the label includes cutting the window in the label leaving a web at a top of the label and a bottom of the label.

In accordance with an aspect of the disclosure, forming a window in the label includes wrapping the label on the container with the two vertical edges of the label forming the window.

In accordance with an aspect of the disclosure, generating the fill gauge includes using a statistical calculation of settled contents in the container to determine the vertical location of indicators and indicia on the label.

In accordance with an aspect of the disclosure, generating the fill gauge includes determining a position of the indicators using volume of the container, a settled volume of the contents, a unit of measure of the indicators, a dosage instruction, or combinations thereof.

In accordance with an aspect of the disclosure, the contents are prescription drugs.

In accordance with an aspect of the disclosure, generating the fill gauge includes selecting the indicia based on the prescription drug and order history for a patient receiving the prescription drug.

The above aspects of the disclosure describe a labeled container, however, the present disclosure is applicable to other devices and structures that may include fill gauges that allow visual inspection into the interior of the container with the fill gauge being individualized to the order and the container.

BRIEF DESCRIPTION OF THE DRAWINGS

Other advantages of the present disclosure will be readily appreciated, as the same becomes better understood by reference to the following detailed description when considered in connection with the accompanying drawings wherein.

In the drawings, reference numbers may be reused to identify similar and/or identical elements.

DETAILED DESCRIPTION OF EXAMPLE EMBODIMENTS

Figure 1A:
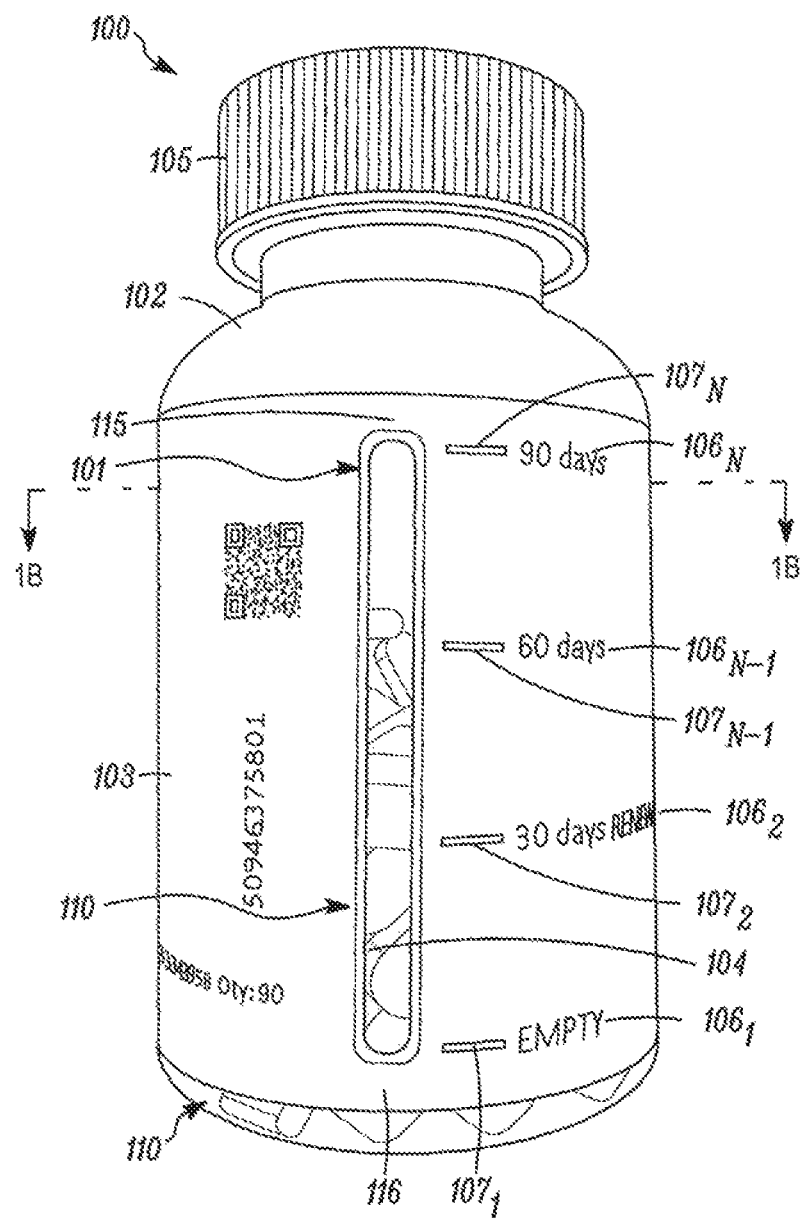
FIG. 1A is a side view of a container with a label in accordance with the present disclosure.

In general, example embodiments of a container with a viewing window and indicia providing a fill gauge for the contents in the interior of the container will now be disclosed. A layout for the fill gauge is determined based on the specific contents placed in the container. The example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the present disclosure. In some example embodiments, well-known processes, well-known device structures, and well-known technologies are not described in detail, as they will be readily understood by the skilled artisan in view of the disclosure herein.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

The container can be provided with a translucent fill gauge built into the label to be fixed to the container. The fill gage includes a scale that is customized to the contents (e.g., prescription drug size, quantity, and known stacked pill characteristics, etc.). The contents can be rigid-dry, which unlike liquids and flowing contents, will leave space between individual contents when filled into the interior of the container. The scale can include indicators, indicia or both to assist in conveying fill information relating to contents in the container. The patient or caregiver sees the quantity of the contents through a window in the label and a content supply in the container (e.g., in days) on the label. The content supply can also indicate the quantity of the contents, e.g., by number of contents or number of doses of content. The patient can be reminded to refill a prescription or renew a prescription on the fill gauge. The label can integrate the prescription information, a barcode, a prescription number and instructions with the fill gauge to avoid label mismatches and convey pertinent information relating to the contents of the container.

FIG. 1A shows a container 100 with a fill gauge 101 according to an example embodiment. The container 100 includes body 102 forming a vertical wall and a closed bottom to define an interior, open volume to store contents 110 therein. The container 102 can be a unitary structure formed from a polymer. The wall, in at least one vertical location, is clear or at least partially translucent so that the interior of the container is visible from outside the container body 102. In an example embodiment, the entire wall is translucent or clear. The contents 110 can include pharmaceuticals, pills, tablets, caplets, capsules, powders, and other dosage forms. The term "pill" may be used in this disclosure as a term to represent any of these content forms. The container 100 can be a bottle to store non-liquid forms, e.g., the contents are dry and can be gripped by a person's fingers in an example embodiment. Each of these contents 110 can store a certain dosage of an active pharmaceutical ingredient or ingestible supplement. The plurality of contents forms a certain number of dispensed individual contents. For example, the number of contents can be a 30, 60, 90, 120 day supply of the dispensed, individual contents. The number of contents can include other quantifiable measures of the contents in the container. Each of the contents has certain dimensions and a known volume. The plurality of contents 110 also has a tendency to orient on themselves while dispensed into the interior volume of the container 100, e.g., the contents settle in the interior of the container. However, the settling of contents in the container interior can be dependent on the number of the contents, the type of the contents, the shape of the contents, and the size of the contents, individually and collectively.

The top of the container is open and can be selectively closed using a closure, here shown as a cap 105. The cap 105 can engage the top of the container 100 to selectively close the top and seal the contents 110 in the interior volume of the container. In an example embodiment, the cap 105 includes threads that engage threads of the top of the container body 102. The cap 105 is above the window 104 and does not cover the window. Other types of closures can removably seal the open top of the container.

The container 100 when used to store prescription drugs is typically colored and translucent. Containers 100 are colored to provide protection to the contents 110, e.g., prescriptions, medicines, vitamins, supplements, ingestibles, and the like. Common colors used are red, green, dark green, cobalt blue and aqua. The container 100 is colored amber to orange, because of its relatively low production price while providing protection for the contents from light. In an example embodiment, the container 100 can be colored red. The coloring can be a tint, e.g., a light coloring or shading that filters some light but allows some light to pass through the container body so that the interior of the body is visible. Contents, e.g. medicines, prescriptions, medicines, vitamins, supplements, ingestibles, and the like, can be negatively affected by light, e.g., UV, or full spectrum sunlight. Accordingly, the containers are colored to reduce the light impinging the contents in the container and reduce the degradation of the container contents 110. Direct sunlight, and some other light, may can damage the contents 110 by a photochemical reaction. Orange, brown and amber colored containers help to prevent light from penetrating through the container body and degrading the contents, e.g., medicines and the like.

A label 103 wraps at least partially around the wall of the container body 102. The label 103 can be a multi-layered constructions with an outer layer being printable, a center structural layer, and an inner adhesive layer (relative to the container body 102). The adhesive layer adheres the label 103 to the container body 102. The outer layer has printing or images or can be printed to have various information on the label. This fill gauge layout is set on the outer layer with consideration of the other content on the label (see, e.g., FIGS. 3 and 4) and the type of container. The label 103 includes a window 104 that forms part of the fill gauge 101. The window 104 is a cut out of the body of the label with edges of the label forming the window 104. The window 104 is elongate and extends vertically substantially the height of the container body 102. The contents 110 in the container can be viewed through the window 104 and clear or translucent part of the body 102. The window 104 has a greater height than it does a width. The widow 104 can be cut out of the body of the label 103. In an example embodiment, the label 103 is cut from a roll of label material and has pre-formed windows 104 therein. In an example, embodiment, the label 103 is fed to a stamper with a die block that fixes the label while a punch engages the label at the window to cut the window into the label. The label 103 can be printed after the stamper cuts the window. The label 103 include printing on the label before the window is cut therein. The window 104 is cut into the label leaving an upper web 115 and a lower web 116, i.e., a thin section of label remaining at the top and bottom of the label, above and below the window 104. The webs 115, 116 can provide structure to the label 103 while the label is being applied to the container 102. In an example embodiment, the window 104 is an absence of label material in the area of the of the label 103 on the container 100. The window 104 can be formed where the label 103 is absent along the vertical wall of the container 100. The window 104 can be defined by edges of the label 103. The window 104 is elongate in the vertical direction with its height being greater than its width, e.g., by a factor of five, ten or more.

The fill gauge 101 on the label 103 includes a plurality of indicia 1061-106N and a plurality of indicators 1071-107N adjacent the window 104. The indicia 1061-106N can provide information regarding the level of the contents 110 in the bottle. The level in the container generally provides an indication of the quantity of contents in the container, which contents are visible through the window. The quantity can be the remaining time it will take to consume the contents. The quantity can be the number of doses in the container over time. The number of doses can be different for different people, e.g., one type of dose is a single pill, a second type of dose is two pills, a third type of dose is three pills, and the like. The quantity can be the number of treatments. The quantity can be the content count in the container.

The indicia 1061-106N can indicate the number of days remaining for the contents 110 for a plurality of different number of days remaining. The indicia 1061-106N can indicate the number of contents remaining in the container at a given level. The indicia 1061-106N can indicate the number of dosages, which can include one or more contents per dosage, remaining in the container at a given level. The indicia 1061-106N show a full quantity at indicia 106N, a quantity 106N_1 below the full quantity 106N, with successively lesser quantities to indicia 1061 as the lowest indicia closest to the container bottom. The indicia 106 can be calculated based on the volume of the container, a settled volume of the contents, unit of measure of the contents (e.g., a day's supply of the contents, e.g., one pill, two pills, three pills, etc.), and the user who receives the container's preferences. These values can be stored in a memory or database and used by a processor to compute the indicia itself and the position of the indicia. As shown, indicia 1061-106N are "empty," "30-days renew," "60-days," and "90-days," respectively. These indicia 1061-106N provide the user with a level value of the contents 110 in the container body 102 and a renew reminder. The renew reminder indicia is calculated to determine the position and the text of the reminder indicia. The renew indicia can be calculated using various inputs, e.g., whether the patient has refills remaining on their current standing prescription, a projected time period needed to deliver a refill, a projected time period needed to renew a prescription, the patient's history of timely refill activity, the patient's prescriber's history of timely prescription renewal activity, and any supply constraints on obtaining or filling the drug that are being experienced by the pharmacy. The indicia 106 can indicate the quantity of the contents in the container body 102.

The indicators 1071-107N are marks to indicate various levels at the window 104. The indicators 1071-107N can be calculated to represent the time remaining of contents in the container, the quantity of contents in the container, the number of dosages remaining in the container. The number "N" of indicators 1071-107N is based on the quantity of contents and the size of the container 102. A low number of contents and a small size of individual contents in a container would have a smaller number N of indicators than a large number of contents in a same container. Likewise, the same number of contents in a larger container may have fewer indicators than in a smaller container. The indicators can be the same shape, e.g., length and width, on the label in an example embodiment. The indicator that is adjacent an action needed by the patient, e.g., the refill reminder or schedule a health care visit, is different than the other indicators. The patient action indicator can be thicker than the other indicators. The patient action indicator can be a different color than the other indicators. The patient action indicator can be a different font than the other indicators. The patient action indicator can be a different line style than the other indicators. The patient action indicator can include a different arrowhead than the other indicators. The patient action indicator has a different length than the other indicators.

In an example embodiment, the indicia 106, indicators 107, or both can be etched directly on the container itself. This can be done in the window 104. The indicia 106 can be on the label with the indicator 107 being at least partially etched onto the container wall in the window. The indicator 107 can be positioned in the wall of the container and on the label.

While the example embodiments show four indicators and indicia, it is within the scope of the present disclosure to have fewer than four indicators and indicia or more than four indicators and indicia. In an example embodiment, there are fewer indicia and indicators. For example, there is one less indicia than indicators. There can be indicia for every other indicator mark.

A container for medicines can be of various sizes. In a system, the container can be 6 drams, 7 dram, 13 drams, 16 drams, 20 drams, 30 drams, 40 drams, or 60 drams. Another size system for containers includes 25 milliliters, 50 ml, 100 ml, 250 ml, and 500 ml. Each of these sizes has its individual dimensions. The label is sized according to the container size. The window is also sized to match the size of the label and the container. The container size is selected based on the availability of the container, as well as the size of the contents, e.g., size of the pills, and the quantity of the contents, e.g., the number of pills. The size of the container, e.g., its diameter, will also influence the stacking of the contents inside the container. The smaller the diameter, the more likely the contents are going to contact and lean against the wall of the container. This may increase the voids in the unorganized stacks of contents in the container.

Figure 1B:
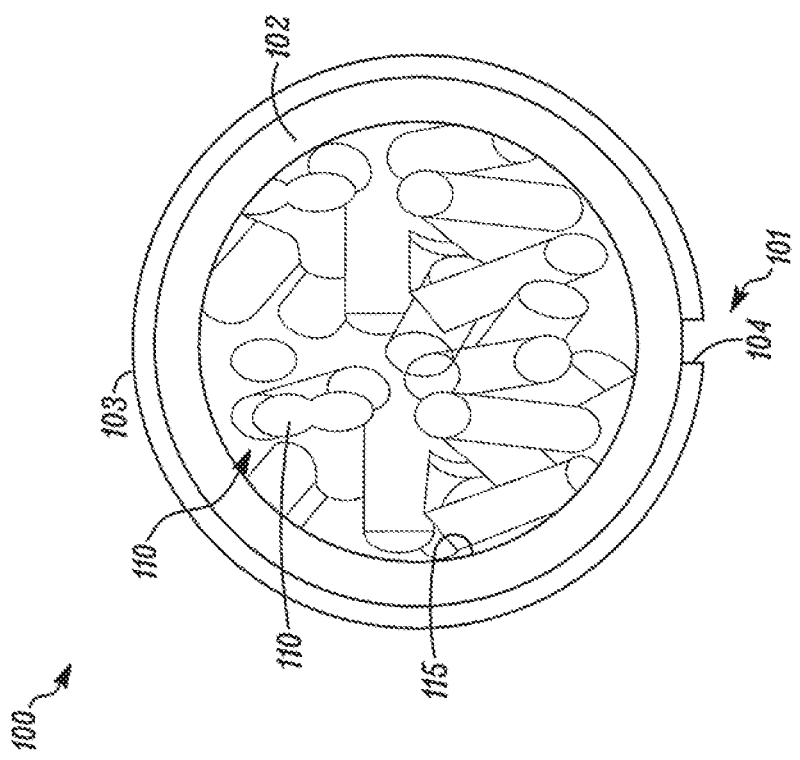
FIG. 1B is a top view of a container with a label in accordance with the present disclosure.

FIG. 1B shows a cross sectional view taken generally along line 1B-1B in FIG. 1A of the container 100. The label 103 is wrapped around wall of the container body 102. The container wall defines the interior volume 115 in which the plurality of contents 110 are stored. The window 101 extends through the label 103. The contents are stored inside the container in an unorganized pile, with some contents at non-right angles leaning against the wall of the container. This creates voids between adjacent contents and adjacent portions of the wall.

Figure 2:
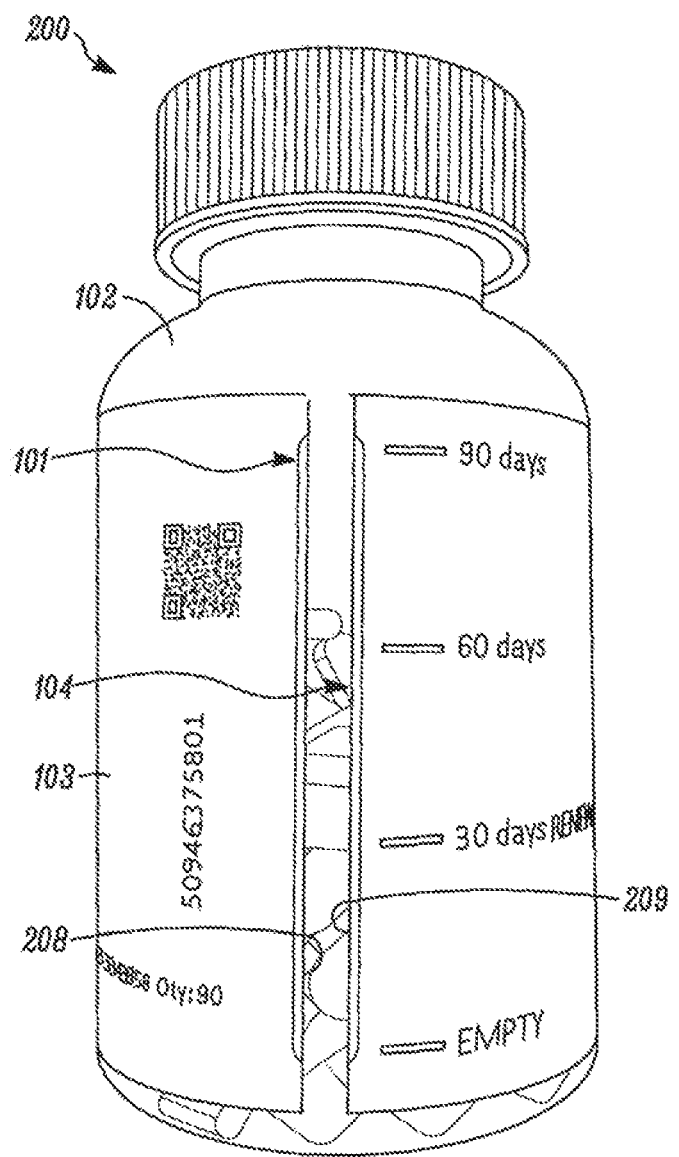
FIG. 2 is a side view of a container with a label in accordance with the present disclosure.

FIG. 2 shows a view of a container 200 that is the similar to the container 100 but the window 204 extends the entire height of the label 103. That is, label 103 does not include the webs 115, 116 of the label shown on the container 100 (FIG. 1A). The window 104 can be defined by the start and end edges 208, 209 of the label 103. The indicators 107 and indicia 106 can be on a single side of the label adjacent one edge 209. In an example embodiment, the indicators 107 and indicia 106 can be on different ends of the label 103 and be adjacent across the window 104 when the label is wrapped around the container body 102. To create the window 104, the label 103 is wrapped around the container body 102 with a gap between the edges 208, 209. The gap defines the window 204. Otherwise, the container 200 is the same as the container 100.

Figure 3:
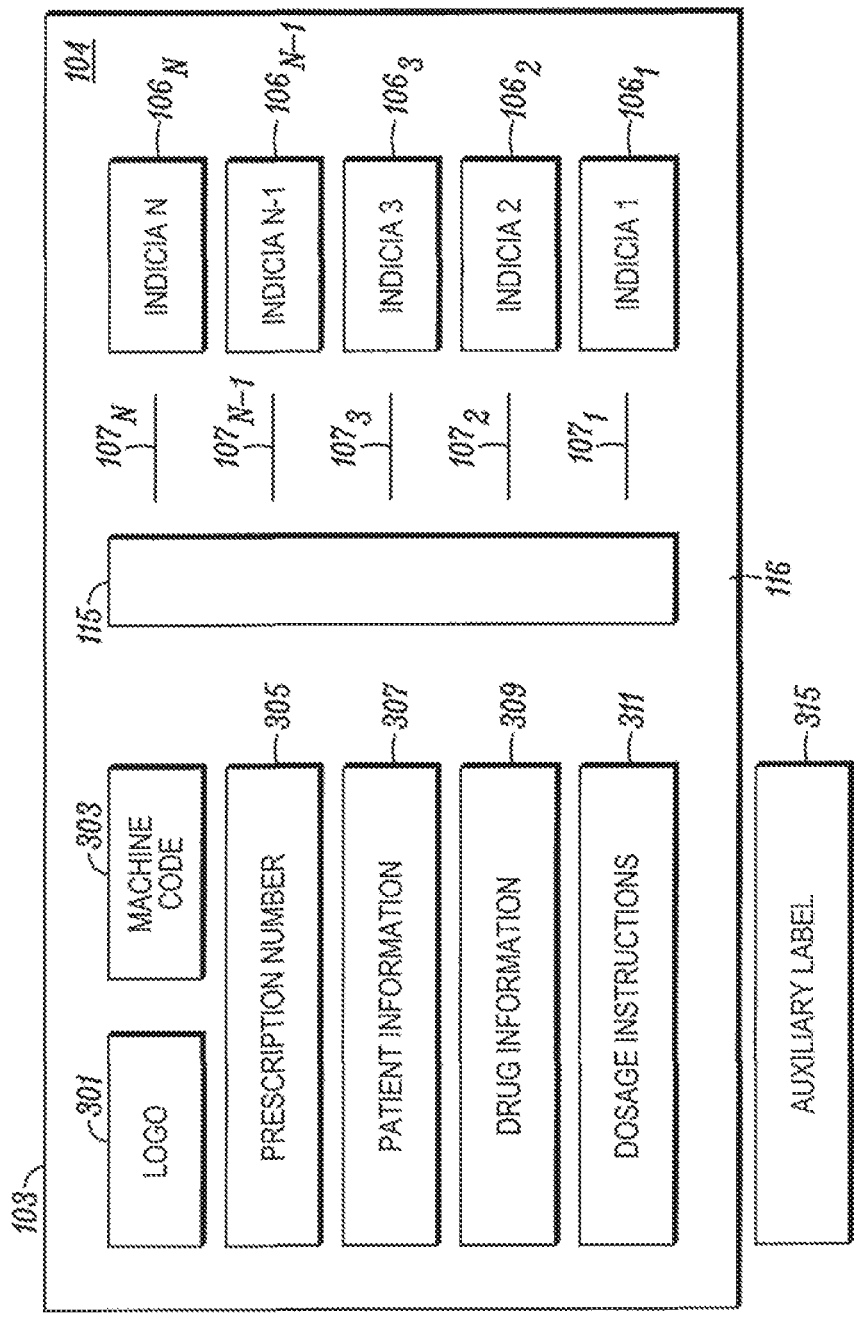
FIG. 3 is a view of a label in accordance with the present disclosure.

FIG. 3 shows a label 103 with fill gauge layout including a window 104 formed therein between the webs 115, 116. The fill gauge layout further includes indicators 107 are adjacent the right side of the window 104 with the indicia 106 to the right of the indicators 107. The indicators 107 positioning along the window are determined based on the size of the container and the characteristics of the contents. Likewise, the indicia 106 are selected based on the size of the container and the characteristics of the contents. The label 103 includes additional information related to at least one of the prescription, the pharmacy, the patient and the like. The additional information can include a logo 301 representing the company who filled the contents in the container or processed the order relating to the contents, e.g., a pharmacy. A prescription number 305 is printed on the label 103. The prescription number 305 can be a numerical string or an alpha-numerical string uniquely identifying the contents and the container. Patient information 307 can be printed on the label 103. The patient information 307 can include the patient name, address, and other identifying information. Drug information 309 can be printed on the label 103. The drug information 309 can include the drug name, the pill strength, an image of the pill, and a shortened drug name. The dosing instructions 311 can be printed on the label. The dosing instructions can include instructions for how many pills to take, at what times the pills should be taken, and the like. An auxiliary label 315 can be added to the label 103 or adjacent to the label. The auxiliary label 315 has a length less than the label 103 such that it will not cover the window 104 when applied to the container. The auxiliary label 315 has a height so that it can contain information for the patient but not tall enough to cover the window 104 or printing/images on the label 103. The auxiliary label 315 can include information related to dosing instructions or storing instructions for the contents in the container body 102.

Figure 4:
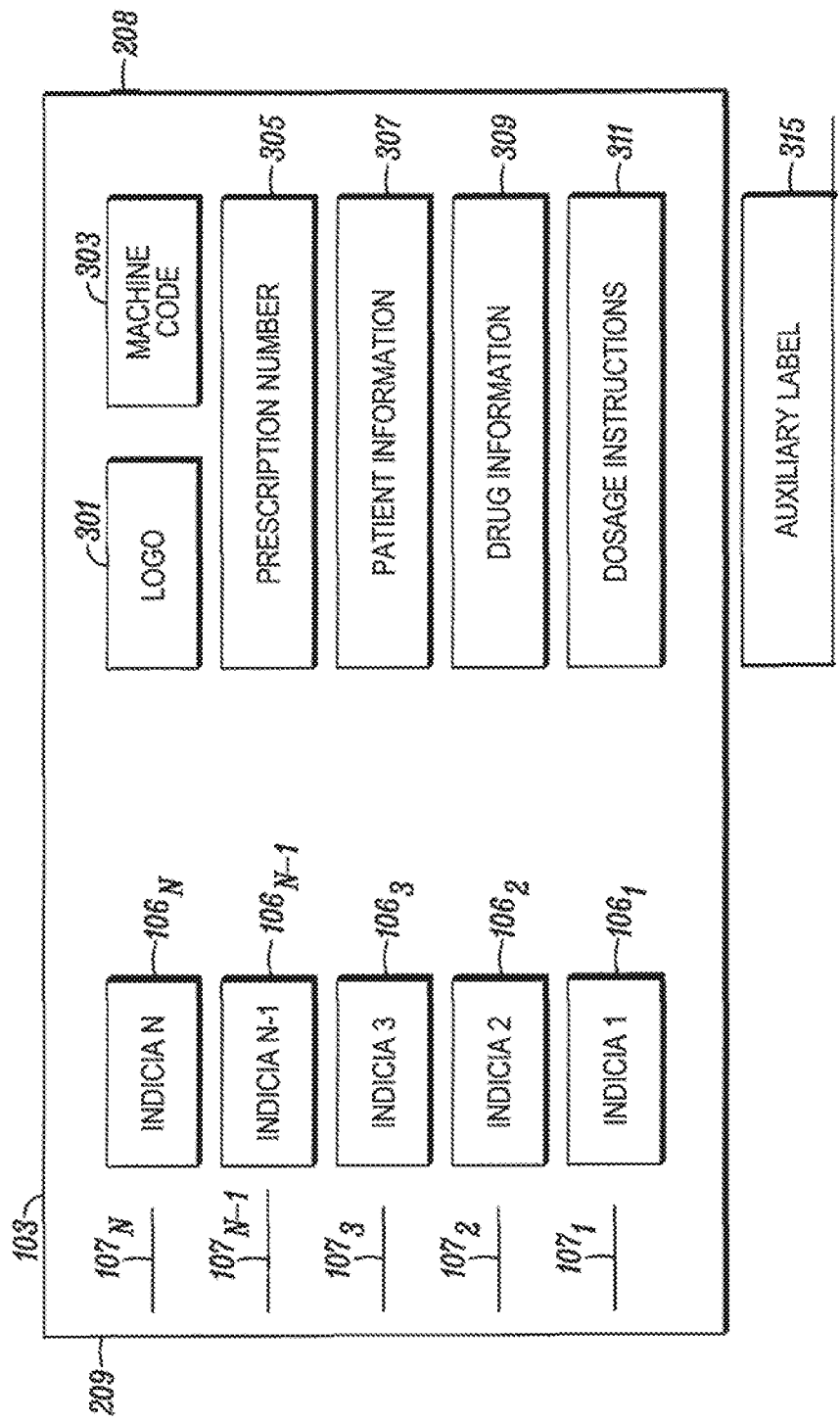
FIG. 4 is a view of a label in accordance with the present disclosure.

FIG. 4 shows a label 103 similar to the label in FIG. 3 except that the edges 208, 209 of the label 103 will form the window 104 into the container 200 to which the label 103 is applied between the edges 208, 209. This provides a different fill gauge layout than in the FIG. 3 embodiment as the fill gauge layout is positioned at two remote edges of the label but can come together with the label wrapped on the container. The length of the label 103 between the edges 208, 209 is shorter than the label shown in FIG. 3 so that the window is formed between the edges 208, 209 when the label 103 wraps around the container body 102. That is the length of the label 103 (FIG. 4) is shorter than the label of FIG. 3

Figure 5:
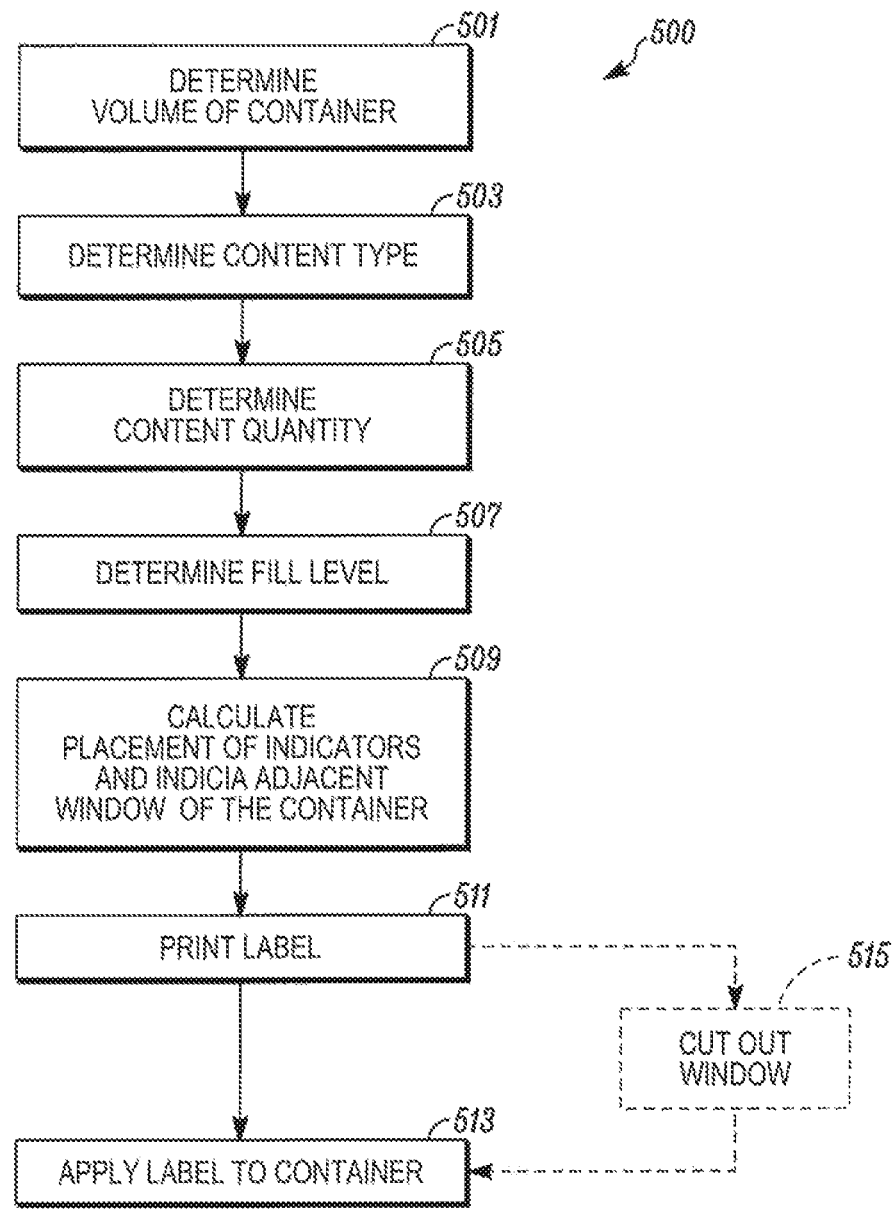
FIG. 5 is a view of a method for creating a label with a viewing window in accordance with the present disclosure.

FIG. 5 shows a method 500 for creating a label with a fill gauge accordingly to the present disclosure. At 501, the volume of the container to store contents therein is determined. Containers for contents, e.g., prescription drugs, come in a variety of sizes that define the internal volume. The containers can be measured in drams or milliliters. Two common container sizes are 100 ml and 500 ml. Either of these sizes can be chosen to fill a prescription with a same quantity of pills, which will result in a different level of contents for a same type and number of contents.

At 503, the content type is determined. The content type can be the type of pharmaceutical in a prescription, including the shape and the volume of each content, e.g., a pill. The shape and the volume of the content are both inputs to determine the levels that contents attain in a container.

At 505, the quantity of the content is determined. This information can be loaded from the order, e.g., a prescription. This can be from an electronic prescription or from an adjudication system. The quantity can be a 30, 60 or 90 day supply in an example embodiment. The contents can be one-a-day or for multiple pills to be taken during a single day. The quantity can be the number of contents, the number of doses, the number of treatments or the like in the container.

At 507, the fill level is computed based on the quantity of the content, the content type and the volume of the container. The fill level can represent the top fill level in the container. The other indicators and indicia are selected based on the fill level of the contents. For example, a sixty day supply will be used to calculate the height of the contents at a sixty day supply (highest indicator), a forty-five day supply, a thirty day supply, and a fifteen day supply (lowest indicator) if the contents are numerous and have sufficient volume for these four indicators and indicia are separate on the label. That is, the corresponding indicators and indicia do not overlap on the label.

At 509, the calculation of the placement of the indicators and indicia is performed. The indicators and the indicia are determined based at least on the contents and the container. The container input can be the internal volume of the container. The contents input can be the shape, the size, and the volume of the content, e.g., round versus elongate (tablet vs. capsule) content. The calculation can be a rule stored in memory and run by processor to take these inputs and calculate the position of the indicators and indicia on the label adjacent the window. The rule can be formed from machine learning by visual inspection of height of the contents, e.g., using a level sensing equipment or a person inspecting. Repeated inspections of the same content (number and type of content) in a same container can provide multiple inputs to determine the rule for calculating the indicators and the indicia on the label. The calculation can be based on similar sized pills as those previously calculated.

The calculation of the indicators and the indicia can also be based, at least in part, on an order history for a patient. The order history of the patient can include the refill history, past prescriptions, adherence data and the like. The indicia can be adjusted to indicate an early time to request a refill or a later time to request a refill.

At 511, the label is created and includes the indicators and the indicia as calculated. In the case where the label is printed, the label can be fed through a high speed printer to print the indicators and the indicia on the label adjacent the window. The label can be laser printed using a laser printer. The label can also be created using heat transfer using a heat transfer machine. The label can be marked to include the indicia and the indicators. The label and/or the container can be etched to form at least one of the indicia and the indicators.

At 513, the label with the fuel gauge is fixed to the container. The label can have a backside layer, remote from the printed side, which includes adhesive or that is applied with adhesive. The adhesive backside layer fixes the label to the container with the printed side being outward of the container. In an example embodiment, an end of the label is pressed against the container and the container to spun for about one rotation of the container to fix the label on the outer surface of the container. A wheel can press the label against the container with the wheel passing over the window.

At 515, an optional step can be performed. The window is formed in the label, e.g., cut or stamped into the label. This can be done after the information is printed on the label. This is an optional step as the label may come formed with the window already cut therein or the label edges can form the window as described herein. The cut area of the label is chosen to be away from the information on the label and adjacent to indicators and indicia.

Figure 6:
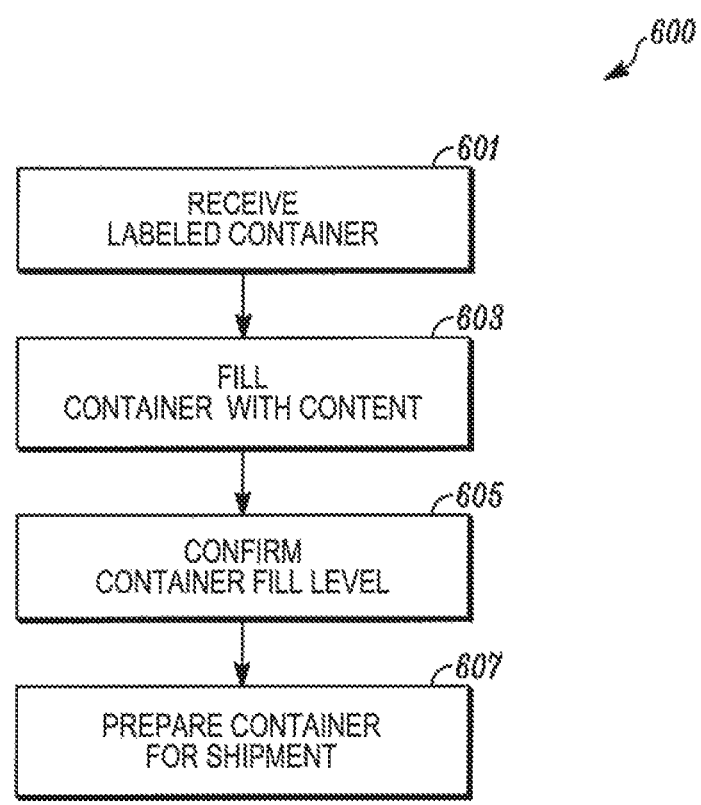
FIG. 6 is a view of a method for using the container in accordance with the present disclosure.

FIG. 6 is a method 600 for filling contents into the container. At 601, the labelled container is received. The container can be verified that it is the correct container, e.g., by a machine reading data on the label. The data on the label can be a machine image, e.g., barcode, a QR code, the prescription number, optical character recognition of the label, or the like.

At 603, the contents are filled into the container. In an example, the container is moved into an automated filling machine, which is part of an automated pharmacy. The filling machine dispenses the contents from the machine into the container. The filling machine can count the quantity of the content being dispensed into the container.

At 605, the content fill level in the container is confirmed. This can be done by a visual inspection or by a measurement taken through the open top of the container. This can be done suing the techniques and systems described in U.S. Pat. No. 10,151,735, titled SOLID CONTENTS VERIFICATION SYSTEMS AND METHODS, which is hereby incorporated by reference for any purpose. In an example, the level of the contents in the container can be verified through the window.

At 607, the container is prepared for shipment to the patient. The container can be packaged into a shipping package, e.g., an envelope, a shipping bag, or a box, with an address label thereon.

Figure 7:
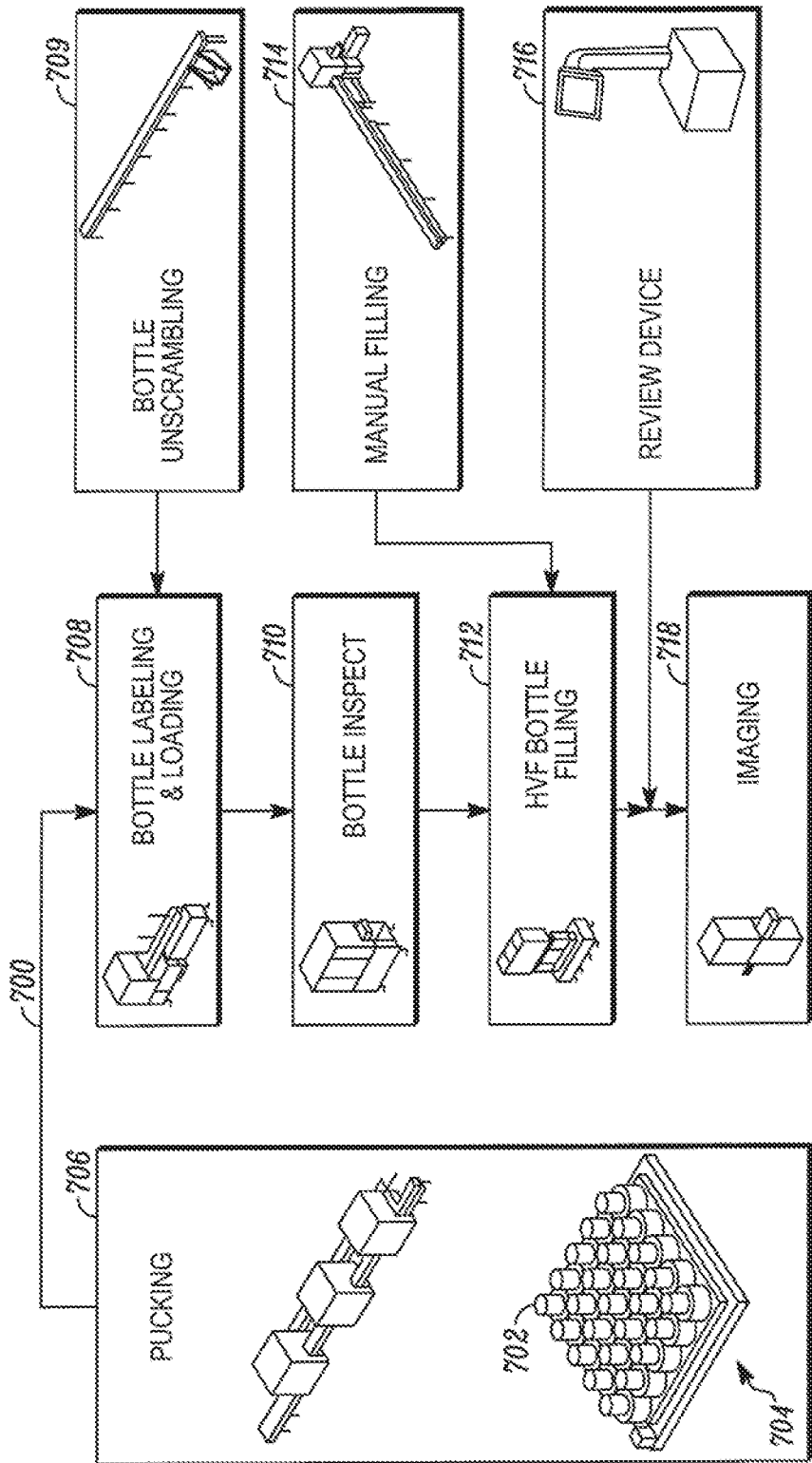
FIG. 7 is a view of diagram of an example implementation of a system for an automated pharmacy in accordance with accordance with the present disclosure.
Figure 8:
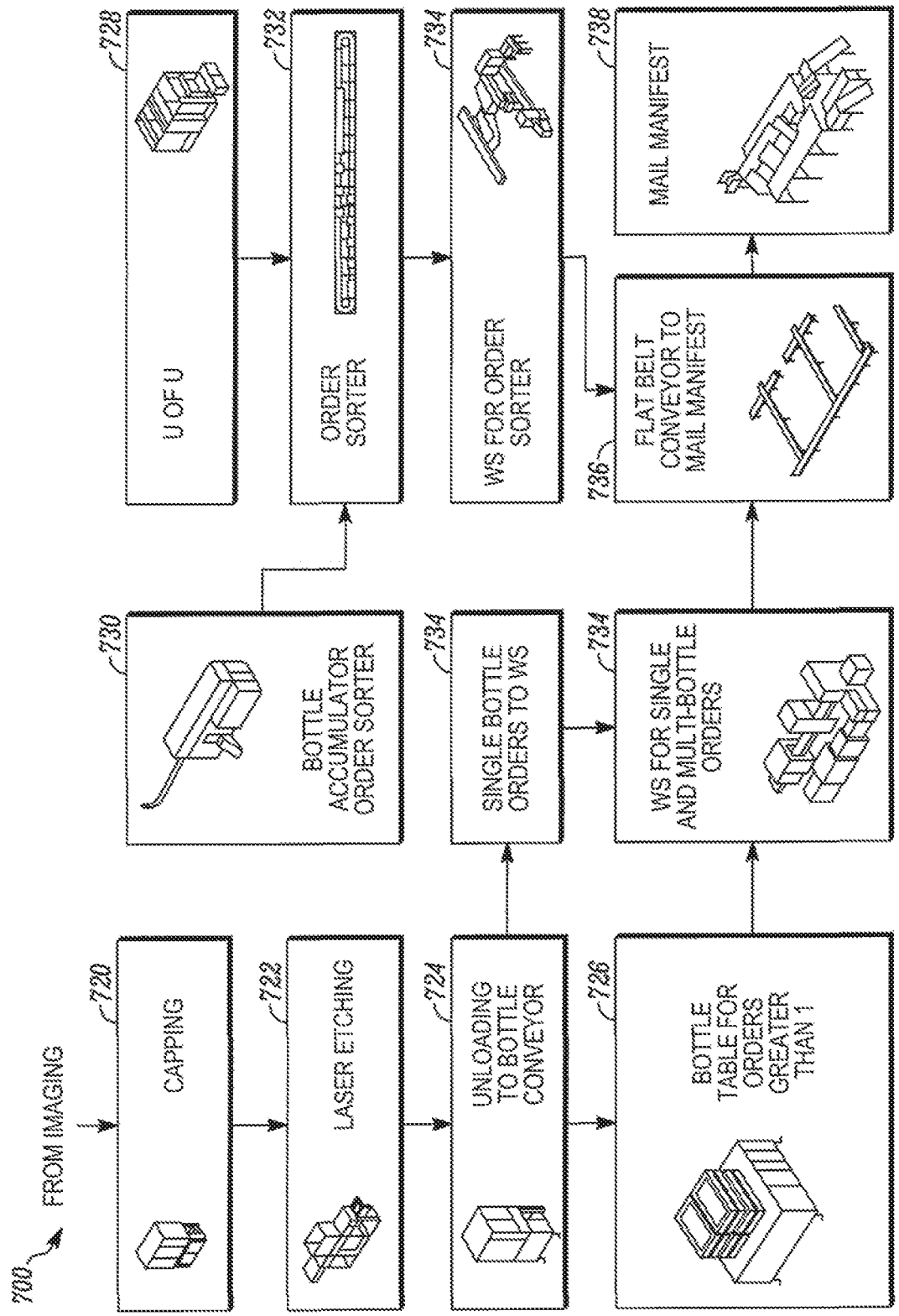
FIG. 8 is a view of diagram of an example implementation of a system for an automated pharmacy in accordance with accordance with the present disclosure.

FIG. 7 is a diagram of a system 700 for filling an order, including creating the label with a fill gauge. FIG. 8 shows additional components of the filling system 700. The system 700 can be part of an automated pharmacy, e.g., a high volume fill (HVF) system. In an automated or high-volume pharmacy (HVP) system generally designated 700 and shown in FIGS. 7 and 8, an order is generated that may include one or more components including, for example, contents, prescription drugs and/or supplements (generally, product(s)), for fulfillment. Generally, the order components include containers, unit of use packages, or other packaging having a quantity of contents, e.g., prescription drugs or supplements or the like therein. The components of a given order may be separated in time and space within the system 700 and are therefore routed to various holding areas and processing areas within the system so that all of the order components of an order may be joined together, or "married", for packing and further processing. For example, a container 100, 200 can be produced at a location remote from another order component, e.g., another container, ancillary parts, printed literature and the like. The system 700 may join the container 100, 200 of the order with other order components. In another example embodiment, the components of an order may be processed separately but arrive at the outgoing shipment from the pharmacy at the same time or ready for delivery to the carrier at the same time. The container with the fill gauge may have the label created at a different location and then transferred to labeling station and then to a content fill location to be filled with content, e.g., a product, drug, prescription, supplement or the like.

Note that the pharmacy described herein is an automated pharmacy, e.g., a high-volume pharmacy, in contrast with a retail pharmacy or a specialty pharmacy, for example. While the system 700 is described as being deployed in a high-volume fulfillment center (e.g., a mail order pharmacy, a direct delivery pharmacy, and the like), the system 700 and/or components thereof may be deployed in a retail pharmacy or a specialty pharmacy, for example. The container with a fill gauge can be used at a retail pharmacy in an example embodiment. The label can be pre-formed with the window and the label components can be printed around the window, including the calculated indicators and indicia, on an order-by-order basis at the retail pharmacy.

Pucking Device

The system 700 transports containers 702 (e.g., between devices described in the system 700) by use of pallets 704. A pallet sizing and pucking device 706 configures pucks in a pallet. The containers 702 can be the containers 100, 200 described herein. The term "puck" is meant to describe a receptacle sized shaped and configured to receive a specific container 702. There can be many different sizes of containers and a corresponding puck is needed to hold the container. A puck is placed in a cavity in a pallet 704 by the pallet sizing and pucking device 706. Containers 702 are supported by the pucks during carriage in the pallet 704. Different pucks may have differently sized and shaped receptacles to accommodate containers 702 of differing sizes and shapes. The pallet 704 defines a transport structure for a number of pucks and the containers 702. The pallet 704 may include a number of cavities that each receive a puck and/or a container 702.

Bottle Loading and Labeling Devices

The automated pharmacy system 700 also includes a loading device 708 for loading containers 702 into the pucks on a pallet 704 by for example, a robotic arm, pick and place mechanism, or other suitable device. The loading device 708 may also print a label (not shown) appropriate for a container 702, which is to be loaded onto the pallet 704, and apply the label to the container 702. The label on the container 702 will include fill gauge as described herein. The labeling device can receive a label on which the fill gauge layout was applied and place the label on the container. The pallet 704 may be located on a conveyor assembly during these operations, e.g., at the automated pharmacy system 700.

Unscramble Device

An unscramble device 709 of the pharmacy system 700 is used to take a supply container of empty containers 702 either from a box, a bin, or other container, and orient the containers 702 in the correct position and load the containers 702 onto the infeed conveyors for further processing within the system 700. The correct position can include orienting the containers in an upright position with the label and/or fill gauge facing a certain direction or to receive the label with a fill gauge.

Container Inspect Device

The pharmacy system 700 also includes an inspect device 710 configured to verify, among other functions, that containers 702 in pallet 704 are correctly labeled and in the correct position on the pallet 704. The inspect device 710 suitably scans a label (barcode, text, or other suitable image) on container 702 in the pallet 704. Labels of the containers 702 may be scanned or imaged in full or in part by the inspect device 710. Such imaging may occur after container 702 has been lifted out of its puck by a robotic arm, picker, or the like, or may be otherwise scanned or imaged while retained in the puck. In some embodiments, images and/or video captured by the inspect device 710 may be stored in a storage device as order data. The inspect device 710 can also view the window to confirm its presence and look into the interior of the container.

Auto HVF Filling Device

An automated high volume dispensing device 712 dispenses ordered contents, e.g., dry form drugs, into containers 702 in accordance with associated orders. High volume dispensing device 712 includes high volume fillers that fill a number of drug types at a rapid rate. A container with the fill gauge can be filled with contents using the high volume dispensing device 712. Orders dispensed by the automated dispensing devices 712 may be packaged individually or in a container for shipping, or may be shipped in combination with other orders dispensed by other devices in the pharmacy system 700. The other orders may include containers with the fill gauge. Within the automated high volume dispensing device 712 are secondary staging devices (not shown) that allow the orders to be pre-staged per order prior to the container 702 actually arriving at the dispense position or lane/area.

Manual Filling Station

A manual fulfillment station 714 is configured for manual fulfillment of orders. For example, the manual fulfillment station 714 is configured to enable fulfillment of drugs in the container 702 by a pharmacist or pharmacy technician. In some embodiments, manual fulfillment station 714 provides the filled container 702 to another device in the pharmacy system 700 to be joined with other containers 702 or items in an order for a patient or member. The manual fulfillment station 714 can include an inspection of the contents of the container through the window of the fill gauge.

Orders dispensed by manual fulfillment station 714 can be packaged individually or collectively for shipping. The order component from the manual fulfillment station 714 may be shipped in combination with other products dispensed by other devices in the pharmacy system 700.

In general, manual fulfillment includes operations at least partially performed by a pharmacist or pharmacy technician. For example, manual order filler retrieves a supply of a prescription drug, makes an observation, counts out a prescribed quantity of drugs and places them into container 702, or the like with at least part of this operation being manual. Some portions of the manual fulfillment process may be automated by use of a machine. For example, counting of capsules, tablets, or pills may be at least partially automated (e.g., through use of a pill counter). The manual fulfillment station can use containers with fill gauges. Specifically, the manual fulfillment station 714 also includes multiple devices (not shown) that capture an image of the medications to aid the pharmacist or technician in counting and verifying that the correct count has been reached. The verification can be through a window in the label, i.e., using the fill gauge.

Review Device

A review device 716 processes containers 702 to be reviewed by a pharmacist for proper pill count, exception handling, verification, and the like. Fulfilled prescriptions reviewed and/or verified by a pharmacist, as may be required by state or local law, either manually or using a review device 716. A pharmacist dispenses certain drugs in compliance with local and/or other laws and operates the review device 716 to visually inspect a container 702 that has been filled with a prescription drug. In an example embodiment, the pharmacist can view the contents through the window of the fill gauge. In an example, an imager takes an image of the contents through the window and stores the image in memory for viewing by the pharmacist or for automated machine processing to confirm the fill amount. The image can also be used to learn the fill amount to properly place the indicators and indicia for a content type and container type. The pharmacist reviews, verifies, and/or evaluates drug quantity (e.g., at least partially using the window of the fill gauge), drug strength, and/or drug interaction concerns, or otherwise performs pharmacist services. The pharmacist also handles containers 702 that have been flagged as an exception, such as containers 702 with unreadable labels, containers 702 for which the associated order has been cancelled, containers 702 with defects, containers 702 without a viewing window if there should be one, and the like.

Imaging Device

The pharmacy system 700 also includes an imaging device 718 that images containers 702 after they have been filled with contents. The imaging device 718 measures the fill height of the content in the container 702 based on the obtained image to determine if the container 702 is filled to the correct height given the type of content and the number of contents in the prescription. Images of the contents in the container 702 may also be obtained to detect the size of the contents themselves and markings thereon. In an example embodiment, the image is taken through the window of the fill gauge. In an example embodiment, a secondary image is taken through an open top of the container. The image can be taken in a visible spectrum or shifted outside the human visible spectrum. The image can also include secondary data, e.g., sonic data, radio frequency data, LIDAR data, and he like, to confirm the fill height of the contents, e.g., through the window, through the open top or both. The open top can be a top before it is closed with a cap. The images may be transmitted to the order processing device 700, and/or stored in the storage device 702 as part of the order data 704.

Capping Device

A cap device 720 is used to cap or seal container 702. In some embodiments, the cap device 720 secures container 702 with a type of closure, e.g., a cap, in accordance with a preference (e.g., a preference regarding child resistance that may be defined by for example, a patient, plan sponsor, or a prescriber). The cap device 720 applies the caps are within a predetermined torque standard that allows for easy removal. Cap-maps are used to validate that the proper torque has been reached and, if not, a secondary inspection by a pharmacist is required. The contents of the container are still visible through the window of the fill gauge even with the cap on container.

Laser Etching Device

The pharmacy system 700 also includes a laser etching device 722 that etches a message and/or image into the cap. In this example, the etching device 722 is a component of the cap device 720. In addition to laser etching, device 722 may include other forms of marking the top of the container 702. For example, device 722 may mark the tops of the containers 702 with ink. In an example embodiment, the laser etching device is directed to the cap, which is opaque, and not toward the window of the fill gauge so that laser energy does not directly impinge the contents through the window. In an example embodiment, the laser etching device etches the indicators at least partially in the outside surface of the wall of the container.

Unloading Station

The pharmacy system 700 also includes an unloading station 724. Generally, there are two types of unloading. The first is smart unloading, which matches the container 702 to an order or literature in sequential order that pertains to the same order for multiple containers. The second unloading type is non-sequential unloading that allows the container 702 and literature to be married up at a later time.

Bottle Table

Bottle tables 726 are used for vertical storage of containers 702 that are sequentially part of the same order. The bottle table 726 will store up to four containers 702 and is used to marry up parts of an order that may be processed at different locations, times, or areas of the pharmacy system 700. The purpose then is to bring all the containers 702 together and release the containers 702 together as an order in a sequential fashion for further processing or bagging. A container 702 including a fill gauge can be married to a container without a fill gauge at the bottle table

Unit of Use Device

The system 700 includes a unit of use device 728 that temporarily stores, monitors, labels and/or dispenses unit of use products. In general, unit of use products are products that are delivered to a patient or member without being repackaged at the pharmacy. These products may include pills in a container, pills in a blister pack, inhalers, and the like. Products dispensed by the unit of use device 728 may be packaged individually or collectively for shipping, or may be shipped in combination with other orders dispensed by other devices in the pharmacy system 700. The unit of use device 728 can include the system 700 for handling environmentally controlled drug order components.

The unit of use device 728 is used to take the manufacturer's bottles, boxes, or containers, and load them into a system that can sort, bag, or combine them with other equipment in the pharmacy, to complete the order. The end result of the unit of use device 728 is have the bottle or container/box bagged and processed for mail delivery. The unit of use device 728 can operate in an environmentally controlled environment, e.g. a temperature-controlled setting that stores and process drugs to maintain the drug in the temperature range during processing and during delivery.

Accumulator

The accumulation device 730 accumulates various containers 702 in an order. The accumulation device 730 may accumulate containers 702 from various devices or areas of the pharmacy. For example, the accumulation device 730 may accumulate containers 702 from the unit of use device 728, the automated dispensing device 712, the manual fulfillment device 714, and the review device 716, at the pharmacy system 700. The accumulation device 730 is used to group the containers 702 prior to shipment to the member or otherwise. The accumulation device 730 shown in FIG. 8 is considered to be a horizontal accumulator, whereas the bottle table 726 can be considered to be a vertical bottle accumulator. The accumulator 730 can receive an order component from the system 700, e.g., a container with a fill gauge.

Order Sorter

The order sorter 732 receives containers 702 from the automated high volume dispensing device 712, manufacturer's containers, or other products, and combines the materials into an order that can be packaged and shipped in the mail system.

Packaging Devices

The pharmacy system 700 also includes a number of wrap seal or packaging devices 734 that package the various components of an order together. The packing device 734 packages an order in preparation for shipping the order. The packing device 734 boxes, bags, sealed coolers or otherwise packages the fulfilled order for delivery. The packing device 734 also places inserts into the packaging. Bulk orders may be shipped in a box, while other orders may be shipped in a bag which may be a wrap seal bag. The packing device 734 may label the box or bag with the address and a recipient's name. The packing device 734 may sort the box or bag for mailing in an efficient manner (e.g., sort by delivery address).

As shown in FIG. 8, the pharmacy system 700 includes multiple packaging devices 734 for packaging different types of orders at different stages of order processing. These packaging devices 734 may be the same device, or may be different devices. Further, there may be more than one packaging device 734 at each depicted location of a packaging device 734. Generally, the packaging devices 734 packages containers 702, which can include a fill gauge, and other order materials from any combination of the automated dispensing device 712, the manual filling device 714, the review device 716, the imaging device 718, the cap device 720, the laser etching device 722, the unloading device 724, the container table device 726, the unit of use device 728, the accumulator device 730, and the order sorter device 732 at the pharmacy system 700.

Flat Belt Conveyor

After an order has been through the packaging device 734, a conveyor 736, e.g., a flat belt conveyor, transports the packaged order to from a packaging device 734 to the shipping manifest 738. The conveyor 736 may hold the containers in an upright manner.

Shipping Manifest Device

The shipping manifest device 738 receives orders from the packaging device 734 and then ships the package through a carrier, postal mail, through a mail order delivery service that ships via group and/or air (e.g., UPS, FedEx, or OHL), through delivery service, through a locker box at a shipping site (e.g., Amazon locker or a PO Box), or otherwise.

Figure 9:
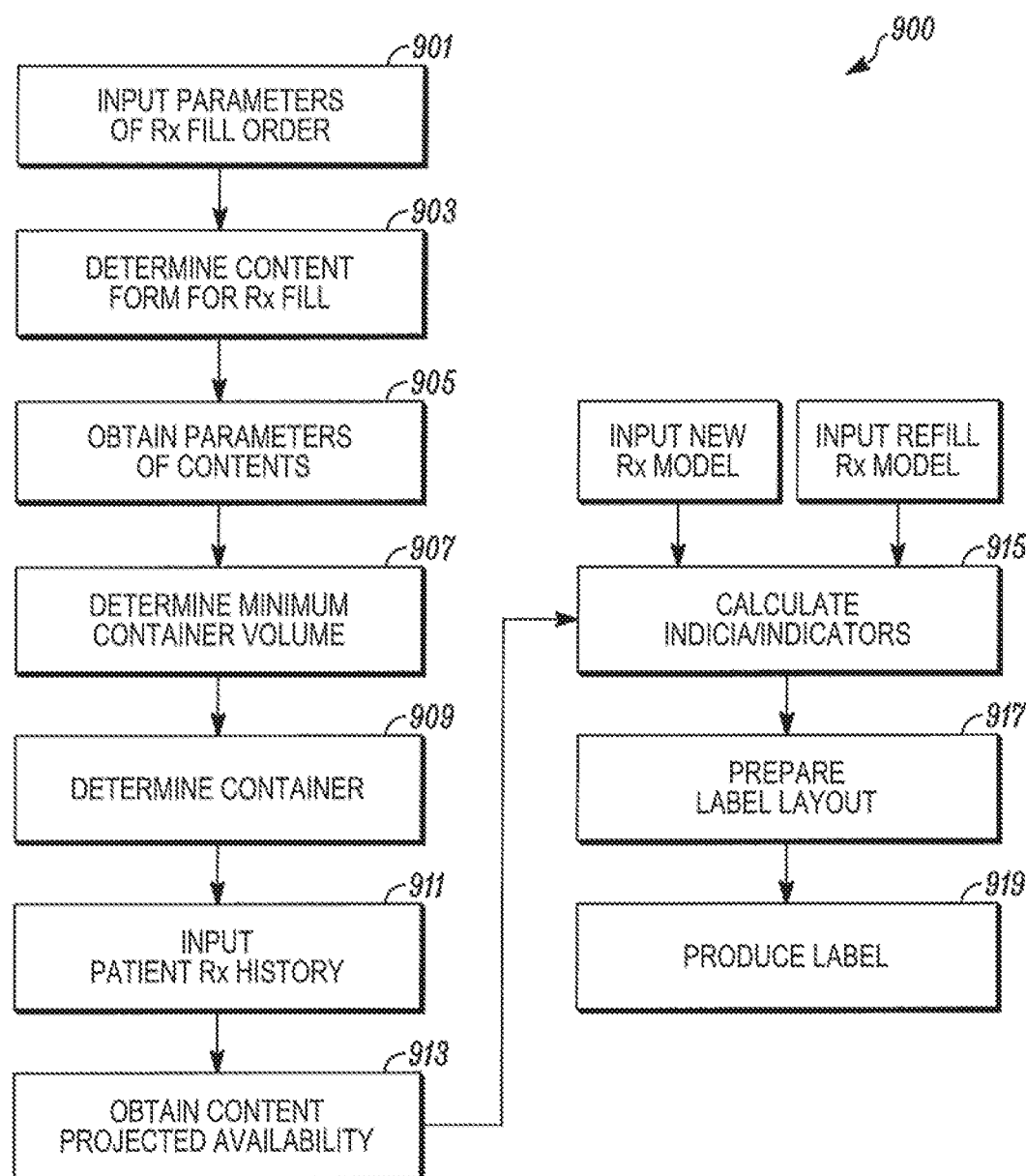
FIG. 9 is a view of a method for creating a label with a viewing window in accordance with the present disclosure.

FIG. 9 shows a method 900 for constructing a container with a fill gauge. In an example embodiment, the method generates a prescription container with a fill gauge to show cumulative drug units in the prescription container. The method can determine the layout for the fill gauge on the label taking into account characteristics of the contents, the information to be included on the label and characteristics of a container. The fill gauge can indicate the level of contents inside the container and with indicators and indicia to convey information relating to one or more levels of contents in the container. The indicators and indicia can be individually determined based at least in part on the characteristics of the contents, characteristics of the container, or both.

At 901, the method receives the parameters of the order, e.g., a prescription order. The prescription order can be received from a communication device of a medical professional or received from a pharmacy benefits manager. The order parameters can be input into a host computing system that has access to an order database containing information about each order. The information in the database can include information needed to fill the prescription, to print a bottle label, to print material to accompany the order, and to ship the order. The order database also preferably includes a record of the order number associated with each order, prescription number associated with each prescription making up the order, and the number of bottles making up each prescription. The computing system can communicate with various components of the system including an automatic prescription dispensing system, a sorter controller, a packer controller, a mail manifest system, a printer controller, a printer, and a labeler. The labeler can include a label printer to print the indicia and indicators, as determined for an individual order, on the label to be adhered the container.

At 903, the content form that will be filled into the container is determined. The form can be the visible shape or configuration of the content. The form can be the three dimensional shape of a prescription content.

At 905, the parameters of the contents to be filled into the container are obtained. A database can store the parameters and can be accessed by a computing system. In the example embodiment with the contents being prescription pills, the parameters can be the shape of the pill, e.g., round, oval, capsule, egg, barrel, rectangle, polygon, kidney, character, heart, U-shape and the like. These are two sided shapes, but the pills extend in three dimensions. The parameters can be the exact three dimensional volume of the individual content unit, e.g., a pill. The characteristics of the contents include a statistical computation of how the supply of contents lie in the interior volume of a container. The shape and volume of each of the contents that can be filled into a container will determine how they lie when piled on top of each other. There will be some space between each of the contents. This space will not always be the same as there will be variability in how a quantity of contents lie on each other and within a volume.

At 907, the minimum container volume for the contents is determined. The minimum container volume is computed based on the characteristics of the contents and the quantity of the contents. The characteristics of the contents can be the shape and the volume of individual contents. The quantity of the contents can be the number of contents for any individual order to be placed into the containers. In the case of rigid, dry contents, the minimum container volume is not merely the sum of the volume of the contents. When a quantity of contents is dispensed into a container, there will be empty spaces (voids) interstitial to adjacent contents due to their rigid nature. It is noted than many pharmaceutical drugs are rigid, dry contents. The minimum container volume can be generated using statistical analysis of the characteristics of the contents, e.g., actual content volume plus the statistically computed space between adjacent contents. The statistical analysis can be updated based on inspection of actual containers having the same contents therein, e.g., images of actually filled containers. This can be done using data from the images generated by the system 1000 of FIG. 10. It can also be analyzed using repeated filling of a container with the contents in a controlled manner, which is repeated to yield multiple results as to the level of contents in a container for a particular container and a particular content. These results can be statistically processed, e.g., mean, median, or other, to determine the maximum fill level of the contents in the container.

At 909, the container that can hold an order of a certain content is determined. The interior volume of any one of the available container is known and can be stored in a database. The interior volume available to store contents is selected to the greater than the computed minimum volume, and containers with an interior volume greater than the computed minimum volume are designated as containers for the contents.

At 911, the order's history is accessed. A database can store an individual's order history. The order is the individual who will receive the container and the contents. In the example embodiment of the contents being prescription drugs, the order's history can be stored in a database at a pharmacy benefit manager (PBM). In the example embodiment of the contents being prescription drugs, the order's history can be stored in a database at a pharmacy. This order history can include the order's preference for a label with a fill gauge. The order history can also include the time it takes to refill a prescription and the delivery time to the patient. The indicia indicating a refill reminder can be adjusted from a first short time to refill to a longer lead time to refill if the patient history indicates that the patient has gone without their medication in the past. The indicia for a refill can be adjusted from one week supply of content left in the container (i.e., a short supply) to two weeks left in the container (i.e., a longer supply). The indicia can also include renewal reminders when the prescription can no longer be refilled. The indicia can indicate when the patient should contact their health care worker to request a refill. The PBM database can include information on renewal on a health care worker database to adjust the renewal reminder based on both patient data and health care worker data. The order history can include whether the patient has refills remaining on their current standing prescription, a projected time period needed to deliver a refill, a projected time period needed to renew a prescription, the patient's history of timely refill activity, the patient's prescriber's history of timely Rx renewal activity, and any supply constraints on obtaining or filling the drug that are being experienced by the pharmacy.

At 913, the computing system can determine the availability of the contents at an individual order filling location. This can be done by tracking the inventory of each content at a filling location, e.g., a pharmacy.

At 915, the position of the indicators (e.g., label parts to indicate level and associate indicia to the level of the contents) and indicia (e.g., text to convey information about the contents). The new order model can be used to determine the type and the position of the indicator and indicia. In an example embodiment, the new order is a new prescription. The refill order model can be used to determine the type and the position of the indicator and indicia for a repeat order. The refill order model may be a new order model that has corrected using actual image data from filled orders for the same contents in the same containers. The indicators are set to be at a certain vertical location along the window in the fill gauge. The indicia are selected based on the contents and the order history.

The model(s) input into step 915 can be generated using various methods. In an example embodiment, a learning system can receive the interior diameter of the cylindrical container (e.g., in mm), the form factor (e.g., size and shape) of the content unit (e.g., a pill). In the case of pharmaceuticals, these inputs may be associated with the national drug code (NOC). Generating the model can include performing a lookup operation in a lookup table that stores this data and pre-calculated outputs given the two inputs, rather than calculating them from the model each time. The model can output the unit count, the vertical height, and a coefficient of volume per content unit, which can take into account interstices between adjacent content units.

The calculated indicators are on a vertical scale along the window. The vertical scale can be thought of as having two segments, a lowest segment, where content units (e.g., pills) rest on the flat hard surface on the bottom of the container; and all the space above that first segment, where pills settle into the crevices of pills below them and thus are stored in a more compact vertical space than the first segment. The degree of this more compacted vertical space effect will be a function of the form factor of the content units and the diameter of the container. This behavior of the contents in the first segment and the different second segment are used in a model to determine the location of the indicators. In an example embodiment, the number of pills and the height in the container are constant for a set number of pills, until the first row (segment one) of content units fills the first row in the container. Thereafter, the height of content in the container will rise. The height will rise at a rate less than double for the rows subsequent to the first row as the content units being added to the interior volume of the container settle into spaces between the lower content units. The coefficient per content unit is the rise in the height per content unit.

Since the pills on the bottom of the container come to rest in the lowest segment of the gauge without changing the mean level seen in the gauge, it is treated as a fixed segment of the gauge, up to a threshold value of N units.

At 917, the label layout including the determined fill gauge layout is prepared. The label includes a plethora of data, see, e.g., FIGS. 3 and 4. The indicators and indicia are known from step 915 but the layout of the label is adjusted for the label size, which is determined by the container size. The layout must include all of the information for the order.

At 919, a label with the indicia and indicators adjacent the window in the label is produced. The indicia and indicators are positioned based in the characteristics of the container and characteristics of the contents. In the case of prescription drugs, other controlled substances, or other real-time packaged contents, the label is individually created based on an order.

Figure 10:
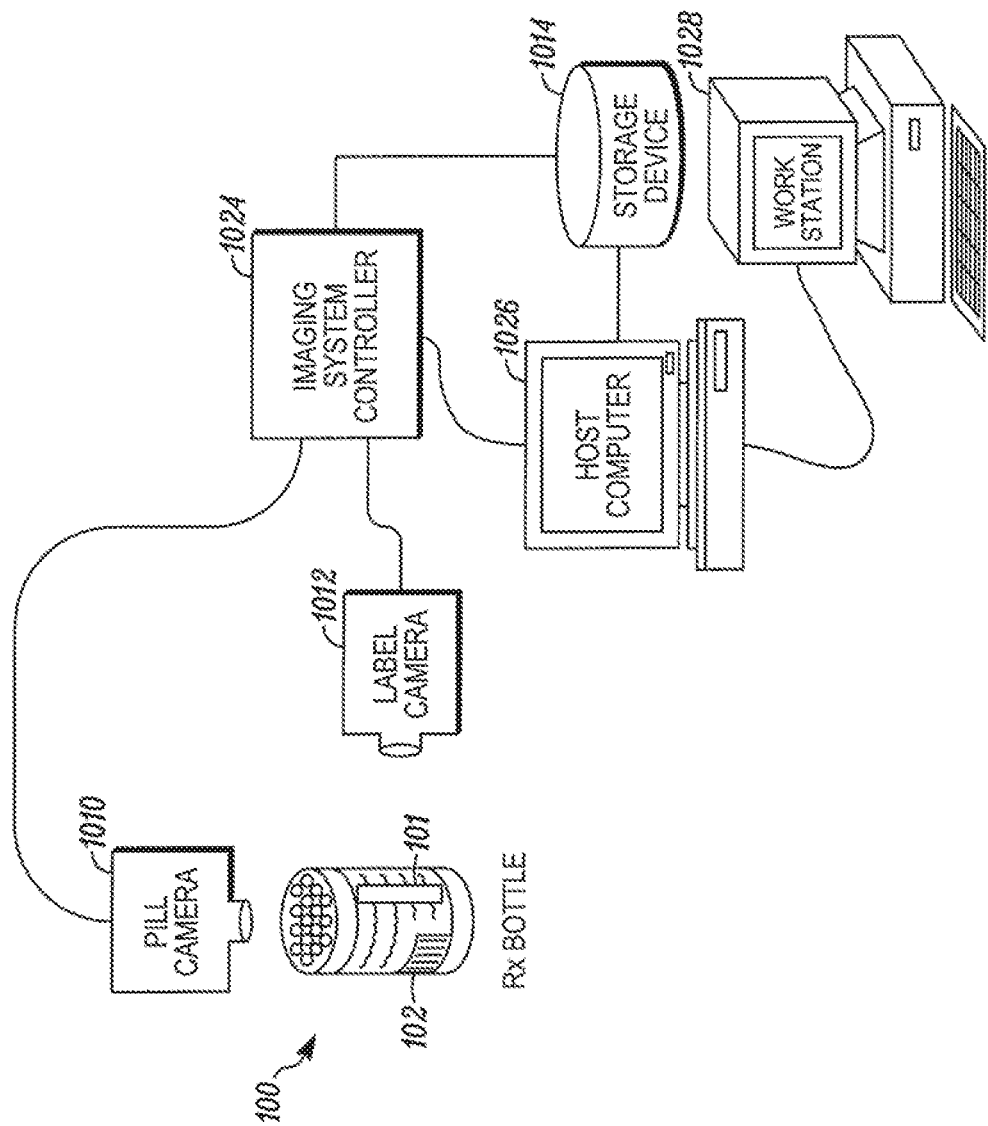
FIG. 10 is a view of a system for imaging contents in a container in accordance with the present disclosure.

FIG. 10 shows a view of an imaging system 1000 that that images the contents in two ways. The system 1000 can be configured to collect data from a plurality of containers 102 being transported along a path. The system 1000 can include a first camera 1010 including a vertical orientation and positioned above a path to capture a top view image of a container 102 at a particular position through an open top of the container. This top view image includes the contents in the container, e.g., a plurality of prescription drugs contained within the container. The system 1000 can include a second camera 1012 having a horizontal orientation and positioned adjacent to the path to simultaneously capture a side view image of the container 102 at the particular position. The side view image including an image of the label 103 applied to the container 102. The label 103 includes printed information relating to the contents in the container. The printed information can include the indicators and indicia associated with the fill gauge 101. The image with further include the side image of the contents through the window and body of the container 102. The side image can be used to confirm the placement of the indicators and the indicia for a particular type of content, the quantity of contents, and the type of container. That is, the side image can be compared to a predicted placement of the indicators and the indicia to confirm that the placement is accurate or adjust the placement of the indicators and the indicia for the particular type of content, the quantity of contents, and the type of container. This analysis of the side image can also be used to adjust the learning in the system and methods, e.g., the method 900 (FIG. 9) to come up with a calculating formula to be applied to prescription processing to adjust the learning system or calculations of the placement of the indicators and the indicia. In operation, a lower lift pusher can lift the prescription container through the path into the particular position. The first camera 1010 captures the top image based on the rotational information associated with the lower lift push. The second camera 1012 captures the top image based on the rotational information associated with the lower lift push.

A computing system 1024, 1026, 1028, including a storage 1014 to store the top view image and the side view image, is configured to associate both the top view image and the side view image with label data, drug data and a reference image.

Figure 11:
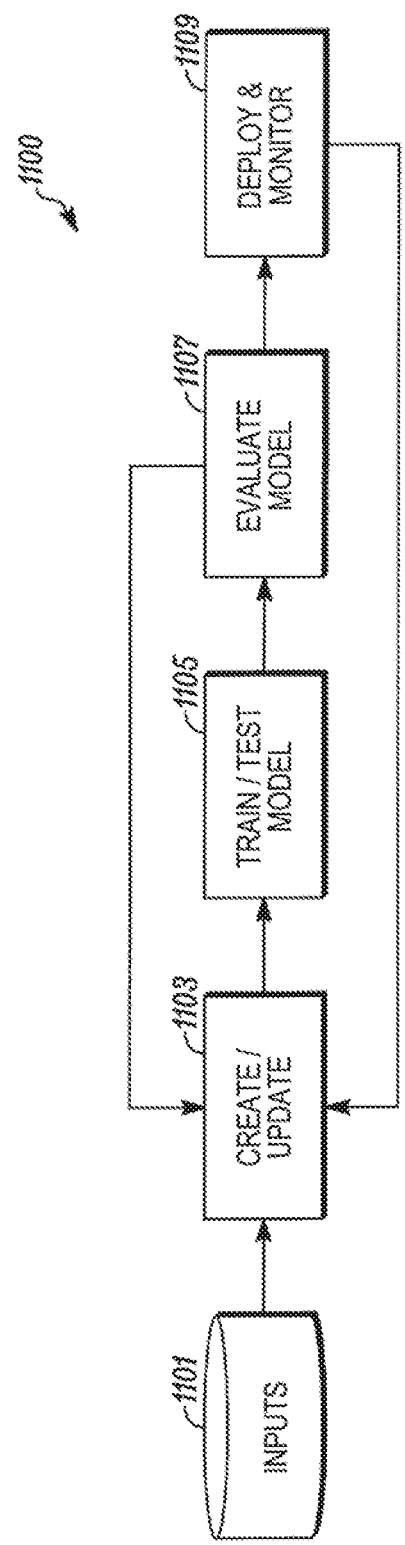
FIG. 11 is view of a diagram for generating models for labels in accordance with the present disclosure.

FIG. 11 shows a learning system to develop models that can be used to generate the labels with the fill gauge as described herein. The models can be developed for different content units and different containers. Inputs 1101 are provided from a database. The inputs can include the interior diameter of the cylindrical container, the form factor (e.g., size and shape) of the content unit (e.g., a pill). The form factor may be associated with national drug code and stored in the database. Each unique combination of the characteristics of the container and the form factor will result in a unique model. At 1103, a model is created or updated. At 1105, the model is trained or tested depending on the computational system being used for the model. The training or testing can include filling a container, which corresponds to the input, with a content unit, which corresponds to the input. The filled container is inspected, e.g., using an imaging system. At 1107, the model is evaluated to determine is the model is accurate or within an acceptable range. If the model is not within an acceptable range, e.g., with the indicators within three or fewer millimeters, then the method returns to 1103 and steps 1103, 1105, 1107 are repeated. Once the model produces accurate positions for the indicators, then the model can be deployed at 1109. At 1109, the model can be periodically checked for accuracy in production environments. If the model is within its accuracy margin of error, the model is used. If the accuracy is not within and acceptable range, the model is returned to step 1103 and the method repeats to update the model. The models are used in the filling production systems to produce indicators and indicia as part of a label with a fill gauge.

The individual models are needed as the form factor of content units are variable and containers may not all be the same. There is an almost infinite possibility of the form factor for drugs and other ingestibles. Drugs can have different form factors as the manufacturer takes into account many different factors when creating a content unit. First, the ingredients and their amounts taken into account. If the drug dosage is high per content unit, then the content unit is larger than smaller dosages. Secondary ingredients also play a part in the form factor. Different drugs may have different secondary ingredients in varying amounts. The content unit must be durable to withstand shipping and gets tested in a human body mimicking machine for durability. There are also factors relating to the production machines, which press the ingredients into a content unit form. It is also desirable to select differently shaped form factors in a same manufacturing location. This makes it easier to spot any cross contamination of the content units with another content unit. These and other factors are used to define a form factor of a content unit.

The method 1100 shown in FIG. 11 can be used to develop other models, e.g., a model for indicia. The inputs can include whether the patient has refills remaining on their current standing prescription, a projected time period needed to deliver a refill, a projected time period needed to renew a prescription, the patient's history of timely refill activity, the patient's prescriber's history of timely prescription renewal activity, any supply constraints on obtaining or filling the drug that are being experienced by the pharmacy, and the like. These can be fed into the model to output a patient renewal risk score. The patient renewal risk score can determine the placement of the indicator and the indicia to indicate to the patient when the prescription should be refilled.

The PBM, which can be part of the processes and systems described herein, can process prescription claims for and provide patient preferences to the pharmacy that is filling a prescription into containers with fill gauges as discussed herein. The PBM receives a claim for the prescription drug from the pharmacy or the prescriber. After receiving the claim, the PBM (e.g., through the benefit manager device) may perform certain adjudication operations including verifying eligibility for the member, identifying and/or reviewing an applicable formulary for the member to determine any appropriate copayment, coinsurance, and deductible for the prescription drug, and performing a drug utilization review (DUR) on the member. The PBM can also store patient preferences, e.g., label with fill gauge, more than one month refill, child proof cap, etc. The PBM provides a response to the pharmacy (e.g. from the benefit manager device to the pharmacy device) following performance of at least some of the aforementioned operations. As part of the adjudication, a plan sponsor (or the PBM on behalf of the plan sponsor) ultimately reimburses the pharmacy for filling the prescription drug when the prescription drug was successfully adjudicated. The PBM database can store whether the patient has refills remaining on their current standing prescription, a projected time period needed to deliver a refill, a projected time period needed to renew a prescription, the patient's history of timely refill activity, the patient's prescriber's history of timely Rx renewal activity, and any supply constraints on obtaining or filling the drug that are being experienced by the pharmacy. These inputs can be used to determine the indicia 106 that added to the label and the location of the indicia 106 on the label.

The container with a fill gauge can also account for a short fill at a pharmacy. The short fill can be when the pharmacy is short of the total quantity of pharmaceuticals for a specific prescription. A short fill can also be a partial prescription as compared to a usual prescription quantity. The reduced quantity of pharmaceuticals can be provided to encourage the patient to follow up with a medical professional. Such a short fill can be used for oncology prescriptions or antidepressants. Oncology patients may need to follow up with their doctor for testing and confirmation that the prescription regime is working for the patient. Likewise, a patient should follow up with a medical professional after being prescribed and antidepressant. It has been reported that as many as 30% to 40% of patients do not respond satisfactorily to the first drug prescribed in the antidepressant class. A short fill can force the patient to interact with their medical professional. The indicia marked on the label can indicate a short fill and indicate when the next medical visit is needed for the patient. That is the indicia can include a reminder to schedule a follow up visit or call with the patient's medical professional. The short fill can also reduce the quantity of wasted pharmaceutical contents. The processes and systems described herein can account for short fills to create the label with fill gauge.

The container with a fill gauge as described herein can provide many benefits, including, but not limited to, increasing patient adherence to a prescription drug regimen. The patient or care giver can monitor the quantity of drugs (i.e., contents) in the bottle (i.e., the container) and be provided with visual reference of the quantity of drug remaining. The patient or care giver need not guess as to the quantity as indicators and indicia are adjacent the fill gauge and are computed to be accurate for the container size and the drug in the container. At times different sized containers can be used to refill a prescription drug, which may cause the patient to incorrectly estimate the quantity of drug remaining in the container over time. This can especially be a problem with extended time refills of over thirty days. The size of the container and the greater quantity of drug may significantly alter the level (i.e., height) of the drug inside the container. Additionally, the indicia can specify the level to which the remaining supply of the drug is reduced where the prescription should be renewed. Renewing on time can assist with adherence as the patient will not be without the prescription for a period of time.

The fuel gauge can also improve patient experience with the pharmacy and while on the medication. The patient need not remember when the prescription was filled and countdown to a thirty day, fifteen day, or less supply of the drug. The indicia informed the patient of when to refill. The indicator can provide a visual to indicate the level. The refill level at the fill gauge can be set by patient preference or be a computed value that ensures the patient will not be without the prescribed drug. Additionally, the indicia can indicate that a refill level is achieved but no refill is available and the patient should contact their medical provider at that time. Accordingly, the patient can experience greater convenience and satisfaction relative to traditionally packaged and labelled drug containers.

The fuel gauge, in an example embodiment, includes a viewing window past the label and into the interior of the container. The contents are viewable in the container interior. Viewing the contents allows a person or a machine to see the contents past the label and through the wall of the container. This allows visual inspection of the contents. Visual inspection may improve safety as the contents can be visually confirmed to look like the known contents and at a known level representing quantity. For example, if the contents are a certain shape or type, that matches a known or stored shape or type for the contents associated with the label, then the content type is confirmed. Additionally, the quantity of the contents can be confirmed through the fill gauge window. If it is known that a certain supply of contents in a select container should be at a certain level, then a person or a machine can detect the level of the contents in container. If the contents are not at that level, e.g., +/−5%, then the container can be flagged to recount the contents or otherwise confirm the contents in the container. The patient can be confident that the contents match their prescription even when a container size changes, the contents change in size or shape, the contents are especially small, and other changes in view of their usual prescription. In the case of a prescription, if a newly filled prescription days-supply doesn't match the indicia on the fill gauge, the contents are suspect because the fill gauge is integral with an individual prescription label.

The fill gauge being integral with the label, which includes identifying information for the patient and identifying information for the contents can provide the patient with an increased assurance and an increased confidence that the correct contents where prepared for the correct patient and regimen because the label and its precise supply gauge (e.g., window in container, indicators and indicia) are an integral product. Generally, the label for prescriptions are strongly adhered to its corresponding container. Removal of the label are self-evident. The label or corresponding printed documents can include an image of the content in the container. The patient can look through the window to confirm the content matches the image. The patient can also be assured that the content is correct as the level of the content matches the indicator, the indicia, or both on the label.

The efficiency and accuracy of filling contents in a container may also be increased using the fill gauge as discussed herein. The fill gauge gives an additional opportunity to detect something is amiss if the wrong contents are present in a container with an integrated label, stated supply, and a fill gauge that corresponds visually to the supply of contents in the container.

The fill gauge is adaptable to both the container size and the contents. Each of the contents has a known size and shape. The contents also have a known total quantity and a known content per day consumption. The container has a known interior volume. Accordingly, the system for filling the container can compute the indicia and indicators on an individual container basis and print the fill gauge on the label for that particular container.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A method of creating a fill gauge on a container to store contents, comprising:
   receiving a content type of dry contents for loading into the container;
   receiving a content quantity of the dry contents for loading into the container;
   receiving a container type; and
   generating a fill gauge layout to be applied to the container to indicate levels of the dry contents in the container using the content type, the content quantity, and the container type, the fill gauge layout including indicia on the label having locations on the label that are based on an interior volume of the container and one or more characteristics of the dry contents, the one or more characteristics including a size of an individual unit of the dry contents, a stacking characteristic of the dry contents, a shape of the dry contents, or a combination thereof.

2. The method of claim 1, wherein generating the fill gauge layout includes applying the fill gauge layout including an indicator and the indicia onto the label.

3. The method of claim 2, wherein generating the fill gauge layout includes determining the locations of the indicia based also on a settled volume of the dry contents, a unit of measure of the dry contents, a dosage instruction, or a combination thereof.

4. The method of claim 3, wherein the dry contents include a prescription drug, and wherein generating the fill gauge layout includes selecting the indicia based on the prescription drug and an order history for a patient receiving the prescription drug.

5. The method of claim 1, wherein generating the fill gauge layout includes forming a window in the label.

6. The method of claim 5, further comprising printing an indicator and the indicia on the label by printing the indicator adjacent the window and the indicia adjacent the indicator.

7. The method of claim 5, wherein forming the window in the label includes cutting the window in the label leaving a web at a top of the label and a bottom of the label.

8. The method of claim 5, wherein forming the window in the label includes wrapping the label on the container with two vertical edges of the label forming the window.

9. The method of claim 1, wherein generating the fill gauge layout includes using a statistical calculation of settled contents of the dry contents in the container to determine the locations of the indicia on the label.

10. The method of claim 1, wherein the fill gauge layout is part of a label and further comprising:
    feeding the label to a stamper with a die block to fix the label; and
    while the label is fixed by the die block, punching the label to cut a window into the label.

11. The method according to 10, wherein punching the label occurs after the indicia is placed on the label.

12. The method of claim 1, wherein generating the fill gauge layout includes:
    contacting a first end of the label against the container;
    spinning the container about one rotation or more to fix the label on an outer surface of the container.

13. The method of claim 12, wherein spinning the container includes pressing a wheel on a side of the label including the indicia with the wheel passing over the window.

14. A method of creating a fill gauge on a container to store contents, comprising:
    determining a content type of a plurality of individual dry contents for loading into the container;
    determining a content quantity of the dry contents for loading into the container;
    receiving a container type; and
    computing fill levels using of the dry contents in the container using the content type, the content quantity, and the container type;
    computing indicia locations to indicate the fill levels of the dry contents in the container with the indicia locations being based on an interior volume of the container and one or more characteristics of the dry contents including a size of an individual unit of the contents; and
    generating a fill gauge layout to be applied to a label based at least in part on the computed fill levels.

15. The method of claim 14, wherein generating the fill gauge layout includes forming a window in the label; and applying an indicator and the indicia on the label by printing the indicator adjacent the window and the indicia adjacent the indicator.

16. The method of claim 14, wherein forming the window in the label includes:
    forming the window in the label leaving a web at a top of the label and a bottom of the label;
    wrapping the label on the container with two vertical edges of the label forming the window; and
    using a statistical calculation of settled contents of the dry contents in the container to determine the locations of the indicia on the label.

17. The method of claim 14, wherein generating the fill gauge layout includes indicia indicating the contents remaining in a quantity other than a number of contents in the interior of the container.

18. The method of claim 14, wherein computing indicia locations includes generating the indicia to indicate a number of days remaining of the contents, which is based in part on a number of contents removed from the interior of the container per day.

19. The method of claim 14, wherein computing indicia locations includes generating a refill indicator showing when a refill of the contents is made to a pharmacy.

20. The method of claim 14, wherein generating the fill gauge layout includes multiple inspections of a same dry content in a same container type to provide multiple inputs to determine a rule for calculating the indicia for the label applied to a container with a same content type and a same number of contents in a same container.

21. A method of creating a fill gauge on a container to store contents, comprising:
    receiving a content type of dry contents for loading into an interior of the container;

receiving a content quantity of the dry contents for loading into the container;

receiving a container type; and generating a fill gauge layout to be applied to a label on the container including a viewing window through the label and indicia to indicate levels of the dry contents in the container with the indicia on the label adjacent the viewing window to indicate a level of the dry contents in the interior after the dry contents are received in the interior, wherein positions of the indicia on the label adjacent the viewing window are based on a volume of the interior and one or more characteristics of the dry contents in the interior, the one or more characteristics including at least one of a size of an individual unit of the dry contents, a stacking characteristic of the dry contents, a shape of the dry contents, or a combination thereof, wherein at least one of the indicia is a renew reminder positioned on the label in a location associated with a time period remaining before a refill of the dry contents is needed for a patient consuming the dry contents, the location of the renew reminder based on one or more of whether the patient has one or more remaining refills on a prescription for the dry contents, a first projected time period needed to deliver the refill of the dry contents to the patient, a second projected time period needed to renew the prescription for the dry contents, a first history of the patient timely refilling the prescription for the dry contents, a second history of a prescriber of the prescription timely renewing the prescription, or a supply constraint on obtaining the refill of the dry contents.

22. The method of claim 21, wherein generating the fill gauge layout includes forming a window in the label; and applying an indicator and the indicia on the label by printing the indicator adjacent the window and the indicia adjacent the indicator.

23. The method of claim 22, wherein forming the window in the label includes:

forming the window in the label leaving a web at a top of the label and a bottom of the label;

wrapping the label on the container with two vertical edges of the label forming the window; and using a statistical calculation of settled contents of the dry contents in the container to determine the locations of the indicia on the label.

\* \* \* \* \*